United States Patent
Bertrand (10) Patent No.: US 7,051,826 B2
(45) Date of Patent: May 30, 2006

(54) SURFACE EFFECT SKIMMER

(76) Inventor: Joseph W. Bertrand, 17215 Flallon Ave., Artesia, CA (US) 90701

( * ) Notice: Subject to any disclaimer, the term of this patent is extended or adjusted under 35 U.S.C. 154(b) by 23 days.

(21) Appl. No.: 10/791,494

(22) Filed: Mar. 1, 2004

(65) Prior Publication Data

US 2005/0205317 A1 Sep. 22, 2005

(51) Int. Cl.
*B60V 1/00* (2006.01)
*B60V 3/00* (2006.01)
(52) U.S. Cl. ..................... 180/116; 114/67 A
(58) Field of Classification Search ................ 180/116, 180/117, 118
See application file for complete search history.

(56) References Cited

U.S. PATENT DOCUMENTS

| | | | | |
|---|---|---|---|---|
| 3,231,038 A | * | 1/1966 | Weiland | 180/120 |
| 3,244,246 A | * | 4/1966 | Weiland | 180/120 |
| 3,275,270 A | * | 9/1966 | Thomas et al. | 244/110 E |
| 3,291,242 A | * | 12/1966 | Tinajero | 180/116 |
| 3,869,020 A | * | 3/1975 | Holland | 180/120 |
| 5,181,580 A | * | 1/1993 | Burg | 180/116 |
| 5,464,069 A | * | 11/1995 | Gifford | 180/116 |
| 6,648,270 B1 | * | 11/2003 | Carter et al. | 244/23 A |
| 6,719,079 B1 | * | 4/2004 | Jones | 180/126 |
| 6,732,672 B1 | * | 5/2004 | Shin et al. | 114/272 |

* cited by examiner

*Primary Examiner*—Tony Winner
(74) *Attorney, Agent, or Firm*—Kenneth L. Green; Edgar W. Averill, Jr.

(57) ABSTRACT

A surface effects skimmer vehicle generates a downward air flow into a tunnel under a main hull to lift the main hull off an adjacent surface, and rearward air flows for thrust. The air flows are generated by ducted fans or jet engines, and directed to the rear and/or down by controlling the degree of opening of a Deflector Air Gate (DAG) on the bottom of the main hull. The tunnel includes tunnel edges to contain the downward air flow under the main hull for surface lubrication. The vehicle further includes a rear portion with horizontal and vertical stabilizers to provide air-craft like behavior.

20 Claims, 8 Drawing Sheets

SURFACE EFFECT SKIMMER

BACKGROUND OF THE INVENTION

The present invention relates to a hovercraft, and most particularly to a surface effect skimming vehicle able to travel at a range of speeds and suitable for both sport and transportation.

Hovercraft are used in various roles including commercial travel, military, and sport uses. By riding on a cushion of air, a hovercraft offers speed, comfort, and avoidance to low obstructions that might prove fatal for a normal water craft. However, known hovercraft require a dedicated lift-fan to provide a cushion of air to support the hovercraft. A skirt of some type is provided, and the hovercraft must remain close to the surface to capture the supporting air within the skirt. The requirement for a skirt limits the design of known hovercraft, and limits the operation to basically remaining parallel to the water surface.

What is needed is a hovercraft capable of providing lift without typical hovercraft limitations.

BRIEF SUMMARY OF THE INVENTION

The present invention addresses the above and other needs by providing a surface effects skimmer vehicle which generates a downward air flow into a tunnel under a main hull to lift the main hull off an adjacent surface, and rearward air flows for thrust. The air flows are preferably generated by ducted fans and directed to the rear and/or down by controlling the extent of opening of a Deflector Air Gate (DAG) on the bottom of the main hull and a pair of thrust gates at the rear of ducted fan boxes on each side of the main hull. The tunnel is formed behind the DAG by tunnel edges to contain the downward air flow under the main hull for surface lubrication. The vehicle further includes a rear portion with horizontal and vertical stabilizers to provide air-craft like control.

In accordance with one aspect of the invention, there is provided a surface effects skimmer comprising a main hull suitable for carrying at least one human occupant. The main hull comprises a bow of the main hull, a stern of the main hull, a port side of the main hull, a starboard side of the main hull, a hull centerline running between the bow and the stern, and a hull bottom defining a tunnel open to the stern. The surface effects skimmer includes at least one air flow created by at least one ducted fan or jet engine, which air flow may be directed to provide a rearward thrust and/or a downward air flow. A Deflector Air Gate (DAG) is pivotally attached to the hull bottom proximal to the bow end of the tunnel, wherein the DAG pivots about a DAG leading edge perpendicular to the hull centerline. The downward air flow is regulated and directed into the tunnel by the DAG to reduce drag between the hull bottom and an adjacent surface. The downward air flow may be augmented by a ram-air flow ducted from the bow (e.g., from an air scoop.) A propellor may further reside proximal to the rear of the tunnel and may be driven by the same power source as the ducted fans.

In accordance with another aspect of the present invention, various motor and fan arrangements are contemplated. A single motor in the bow may drive two pairs of port and starboard fans, or a single port and a single starboard fan. A port motor may drive a single port fan or a pair of port fans, and a starboard motor may drive a single starboard fan or a pair of starboard fans. In each case, the motor(s) are preferably coupled to the fans by clutches, and more preferably by centrifugal clutches. Further, the motor and fan combination may be replaced by a turbo fan (e.g., turbo jet) engine or a jet engine.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1A:
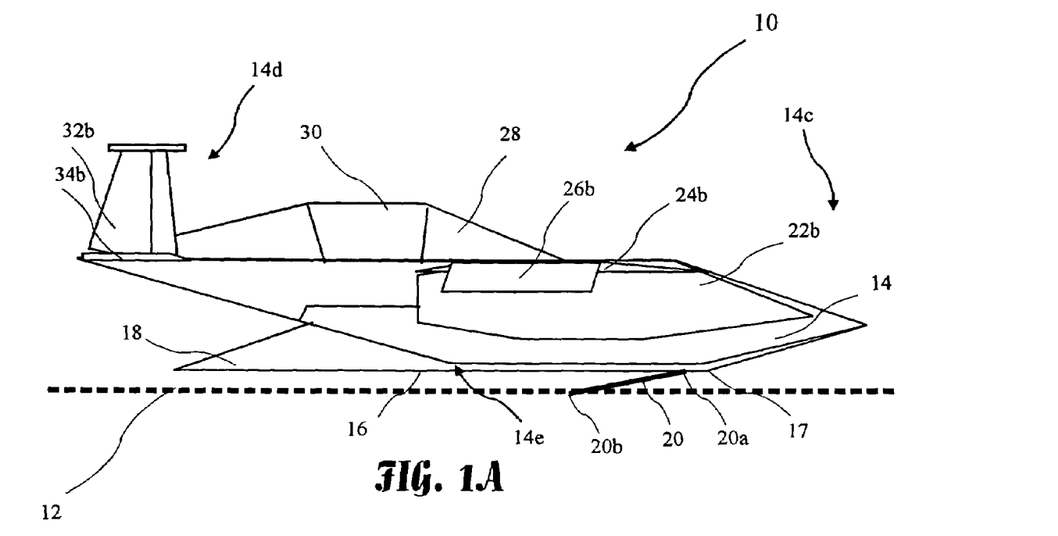
FIG. 1A is a side view of a Surface Effects Skimmer (SES), according to the present invention.
Figure 1B:
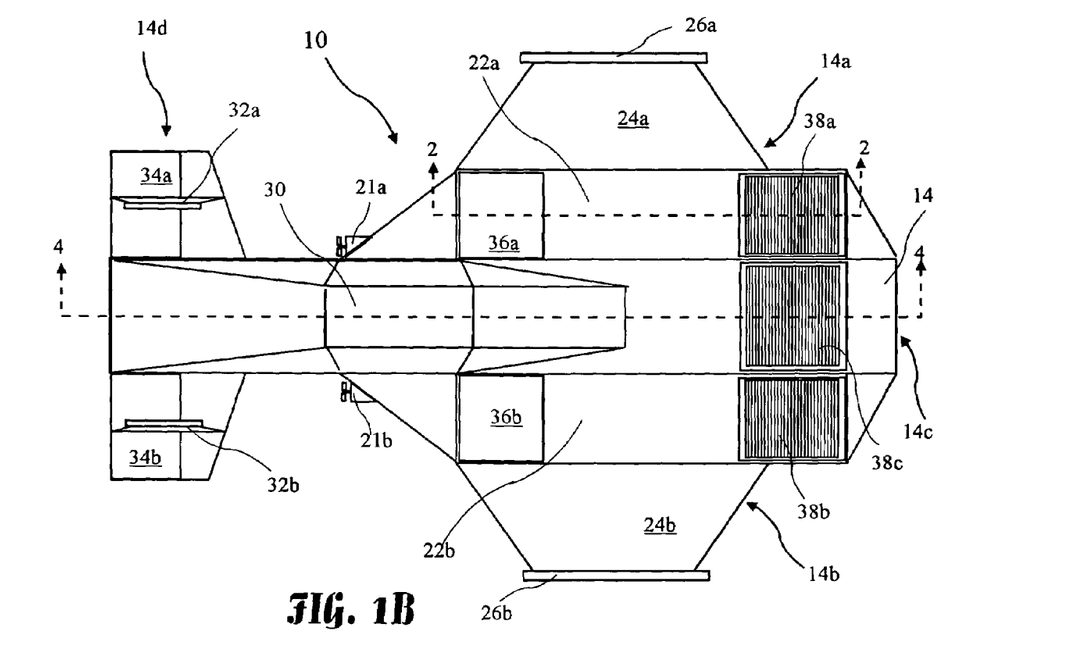
FIG. 1B is a top view of the SES, according to the present invention.

A side view of a surface effects skimmer vehicle 10 is shown in FIG. 1A, and a top view in FIG. 1B. The vehicle 10 skims over a surface 12 and is shown in a configuration suitable for carrying a single occupant, but may be scaled for multiple occupants, or to carry cargo. The main hull 14 includes a port side 14a, starboard side 14b, bow end 14c, stern end 14d, and bottom 14e. The main hull 14 is preferably between approximately 20 feet in length for a single occupant vehicle. The main hull 14 extends substantially (i.e., extends sufficiently to provide balance to major vehicle 10 elements) the length of the vehicle 10 and the hull bottom 14e defines a tunnel 16 under a center portion of the main hull 14, which tunnel 16 includes a tunnel trailing edge 18 at the rear of the tunnel 16, which trailing edge 18 defines a sharp stern pointing horizontal edge. The tunnel 16 is preferably between approximately one half and approximately two thirds the length of the main hull 14, and preferably between approximately twenty four inches and approximately thirty six inches in width, and more preferably thirty inches in width. The hull bottom 14e may be staggered or stepped to create a washboard like surface.

A Deflector Air Gate (DAG) 20 is attached to the hull bottom 14e near a bow end 17 of the tunnel 16, and is preferably approximately the width of the tunnel 16, and is preferably approximately square. The forward edge 20a of the DAG 20 is pivotally attached to the hull bottom 14e, and is spring loaded in a closed (i.e., lying flat against the hull 14) position and may be opened to approximately a twenty degree angle, preferably by setting the pressure of an airshock. The extent of opening the DAG 20 both adjusts the contact of the hull 14 with the surface 12, and produces a downward airflow behind the DAG 20 and into the tunnel 16, which downward air flow (see FIG. 4 at 54) provides a lubricating sheet of air between the hull bottom 14e and the surface 12. The DAG trailing edge 20b may intersect the surface 12.

Port and starboard ducted fan boxes 22a and 22b are attached to the sides 14a and 14b of the hull 14. Port and starboard outriggers 24a and 24b extends out from the ducted fan boxes 22a and 22b, and port and starboard outrigger deflection tips 26a and 26b extend down from the outriggers 24a and 24b. The outriggers 24a and 24b may provide both stability and lift to the vehicle 10. The outrigger tips 26a and 26b extend downward from the outboard edges of the outriggers 24a and 24b, and help limit the roll of the vehicle 10 during turns. The outriggers 24a and 24b preferably extends outward between approximately sixty percent and approximately ninety percent of the overall vehicle length, and more preferably approximately seventy five percent of the overall vehicle length. The port outrigger deflection tip 26a projects downwardly from the port most edge of the port outrigger 24a and the starboard outrigger deflection tip 26b projects downwardly from the starboard most edge of the starboard outrigger 24b wherein the outrigger tips are adapted to limit roll when the outrigger tips contact the surface 12, wherein the outrigger deflection tips 26a and 26b preferably extend downward from the outriggers 24a and 24b sufficiently to limit vehicle 10 roll to preferably between approximately ten degrees and approximately twenty degrees, and more preferably approximately fifteen degrees.

Port and starboard horizontal stabilizers 34a and 34b are attached to the hull stern 14d. The horizontal stabilizers 34a and 34b may be independently controllable for lift, dive, and split tail control, and may be used to trim the vehicle 10. Port and starboard vertical stabilizers 32a and 32b are attached to the horizontal stabilizers 34a and 34b and may be controlled for turning, and are tilted inward for high speed banking. Port and starboard trolling motors 21a and 21b are provided for low speed (i.e., docking) maneuvering. The trolling motors 21a and 21b are mounted behind the port and starboard ducted fan boxes 22a and 22b, and proximal to the hull bottom 14e.

Figure 1C:
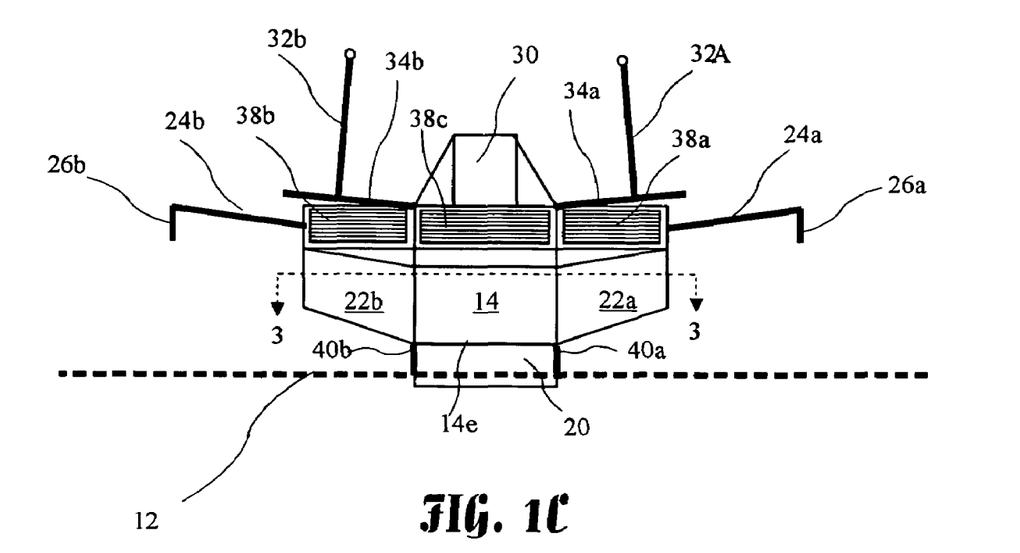
FIG. 1C is a front view of the SES, according to the present invention.

Port and starboard air inlets 38a and 38b reside near the front of the ducted fan boxes 22a and 22b, and port and starboard thrust gates 36a and 36b reside near the rear of the ducted fan boxes 22a and 22b. The vehicle 10 further includes a canopy 30 and a windshield 28. A front view of the vehicle 10 is shown in FIG. 1C. Port and starboard tunnel edges 40a and 40b are attached to port and starboard edges of the hull bottom 14e to define sides of the tunnel 16. The tunnel edges 40a and 40b are preferably tapered and extend from approximately three inches at the bow end 17 of the tunnel 16 to approximately zero inches at the tunnel trailing edge 18.

Figure 2:
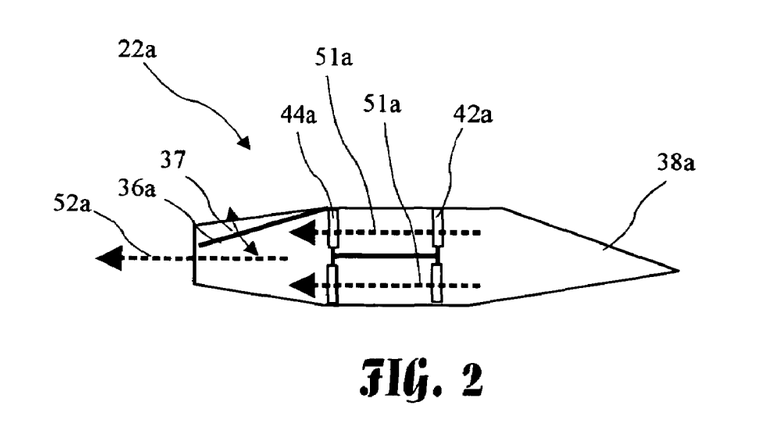
FIG. 2 is a cross-sectional view taken along line 2—2 of FIG. 1B, of a ducted fan box of the SES, according to the present invention.

A cross-sectional view taken along line 2—2 of FIG. 1B is shown in FIG. 2. The port thrust gate 36a is variable through a first arc 37 to actively regulate, or in passive response to, a port air flow 51a (see FIG. 3B) generated by a port forward fan 42a and port rearward fan 44a, resulting in a port rearward thrust 52a.

Figure 3A:
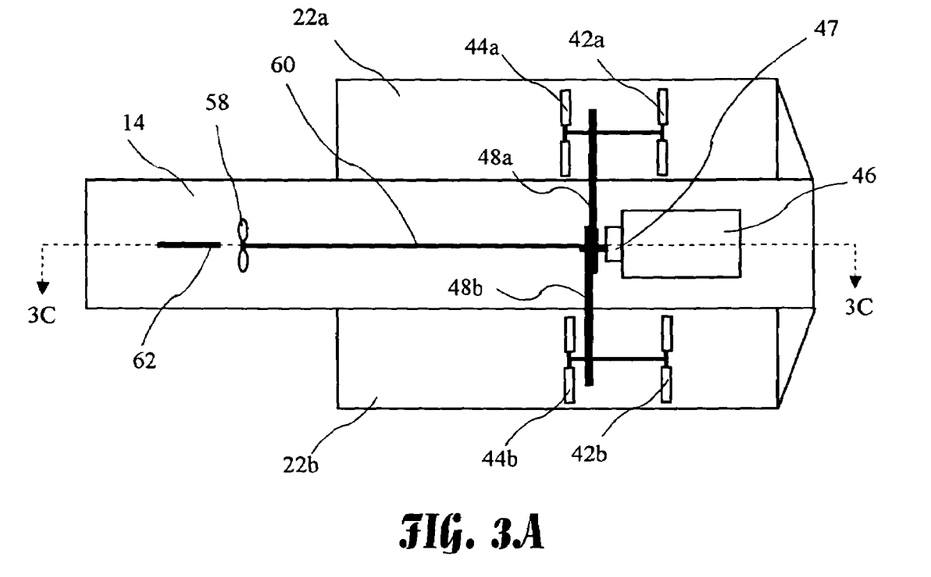
FIG. 3A is a cross-sectional view taken along line 3—3 of FIG. 1C, of a motor, fans, and propellor of the SES, according to the present invention.

A cross-sectional view of the ducted fan boxes 22a, 22b and main hull 14 taken along line 3—3 of FIG. 1C is shown in FIG. 3A. The main hull 14 contains a motor 46 which drives the port and starboard forward fans 42a and 42b, and port and starboard rearward fans 44a and 44b, using port and starboard belts 48a and 48b. The motor 46 is preferably an automotive engine, but may be any motor providing sufficient power and meeting weight and size limits, for example, a gas turbine, and is connected to the belts 48a,48b through a clutch 47, which is preferably a centrifugal clutch. A propeller 58 is connected to the motor 46 by a propellor shaft 60. A rudder 62 is positioned behind the propellor 58. Water and air is ducted to the propellor 58 from the rear of the tunnel 16.

Figure 3B:
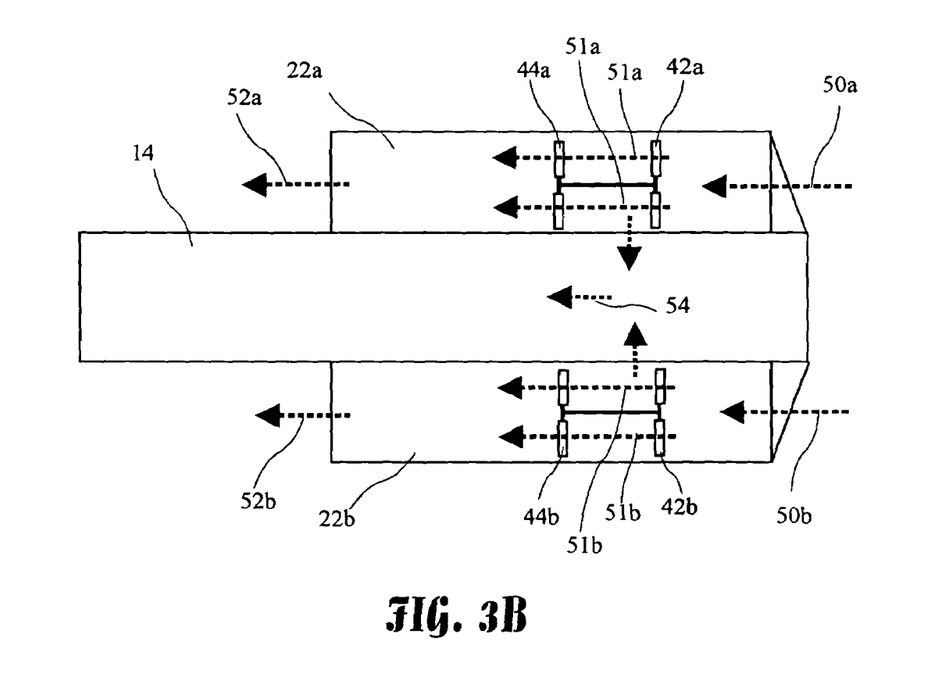
FIG. 3B is a cross-sectional view taken along line 3—3 of FIG. 1C, of air flows of the SES, according to the present invention.

A second cross-sectional view taken along line 3—3 of FIG. 1C is shown in FIG. 3B depicting air flow through the main hull 14 and the port and starboard ducted fan boxes 22a and 22b. Port and starboard inlet air flows 50a and 50b enter the ducted fan boxes 22a and 22b through the port and starboard air inlets 38a and 38b (see FIG. 1B). The air flows 50a and 50b are accelerated by fans 42a, 42b, 44a, and 44b to generate the port and starboard air flows 51a and 51b. A port rearward thrust 52a is derived from the port air flow 51a, and a starboard rearward thrust 52b is derived from the starboard air flow 51b. The amount of thrust 52a and 52b may be regulated by controlling the thrust gates 36a and 36b (see FIG. 2) or may be a result of the amount of air released by the DAG 20 (see FIG. 4).

Continuing with FIG. 3B, a downward air flow 54 is derived from both air flows 51a and 51b, and is regulated by the DAG 20, and also may be influenced by the thrust gates 36a and 36b (see FIGS. 1B and 2). While the rearward thrust has been described herein as port and starboard rearward thrusts, the two rearward thrusts could be combined into a single centered rearward thrust, and a vehicle having a single centered rearward thrust is intended to come within the scope of the present invention.

Figure 3C:
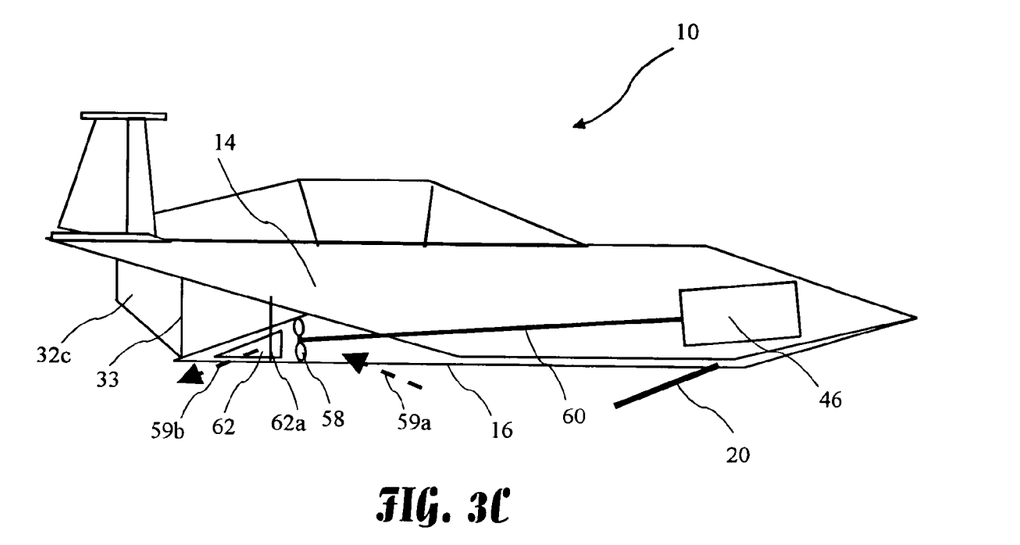
FIG. 3C is a cross-sectional view taken along line 3C—3C of FIG. 3A.

A cross-sectional view taken along line 3C—3C of FIG. 3A is shown in FIG. 3C. The propeller 58 resides under the main hull 14 and is driven by the motor 46 through the propeller shaft 60. The rudder 62 is behind the propeller 58, which rudder 62 is on a rudder shaft 62a. An inward water flow 59a flows into the propeller 58, and an outward water flow 59b is generated by the propeller 58. A lower vertical stabilizer 32c resides near the stern of the vehicle 10 and extends downwardly on a lower vertical stabilizer shaft 33 from the main hull 14.

Figure 4:
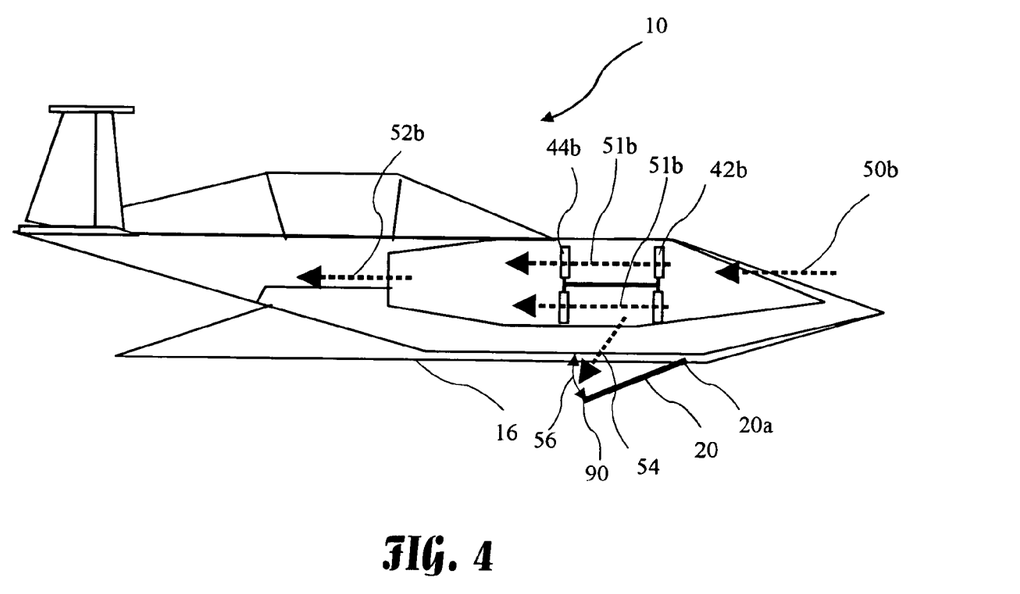
FIG. 4 is a side view of the SES showing a downward air flow.

A side view of the vehicle 10 showing air flows is shown in FIG. 4. A second arc 56 of the DAG 20 is shown, and the downward air flow 54 is shown as directed by the DAG 20. A side view is shown of the starboard inlet air flow 50b, the starboard air flow 51b created by the fans 42b, 44b, and the resulting starboard rearward thrust 52b. If the starboard thrust gate 36b (see FIG. 2) is closed, the starboard air flow 51b is substantially directed to the downward flow 54.

Figure 5A:
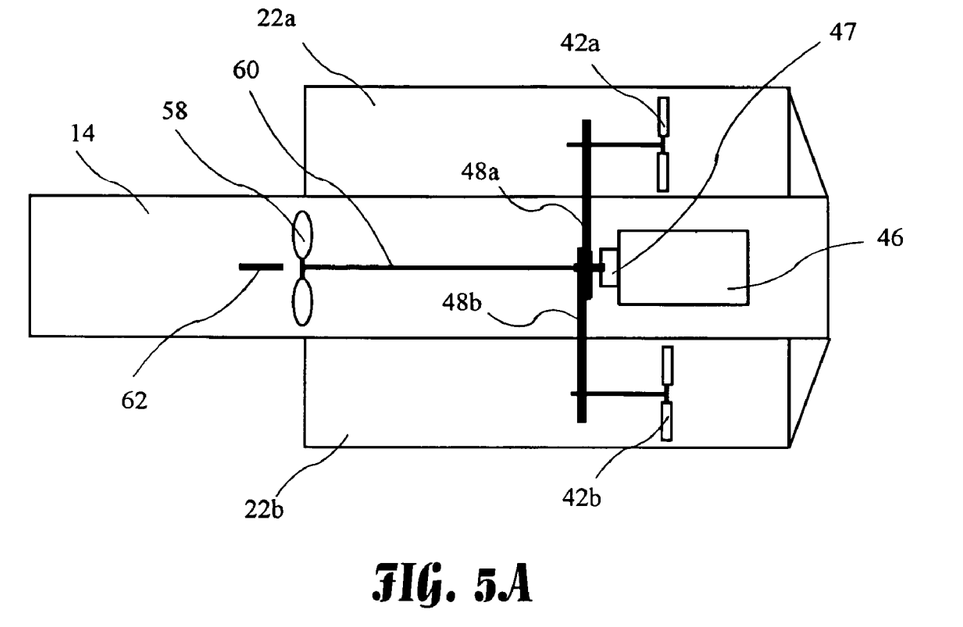
FIG. 5A is a first alternative embodiment of the motor and fans of the SES, according to the present invention.
Figure 5B:
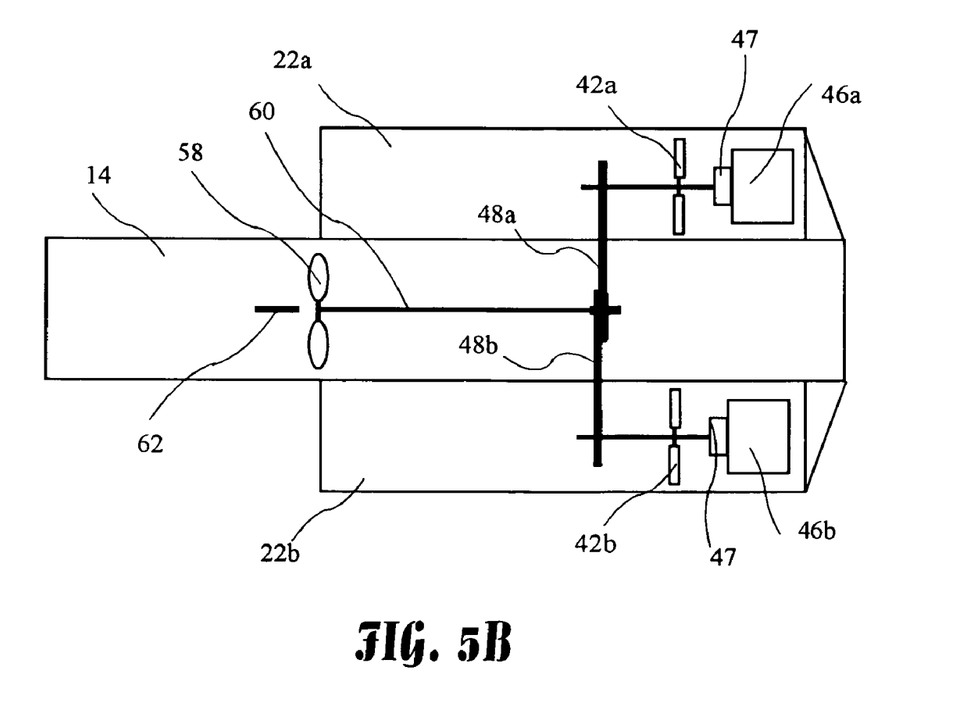
FIG. 5B is a second alternative embodiment of the motor and fans of the SES, according to the present invention.
Figure 5C:
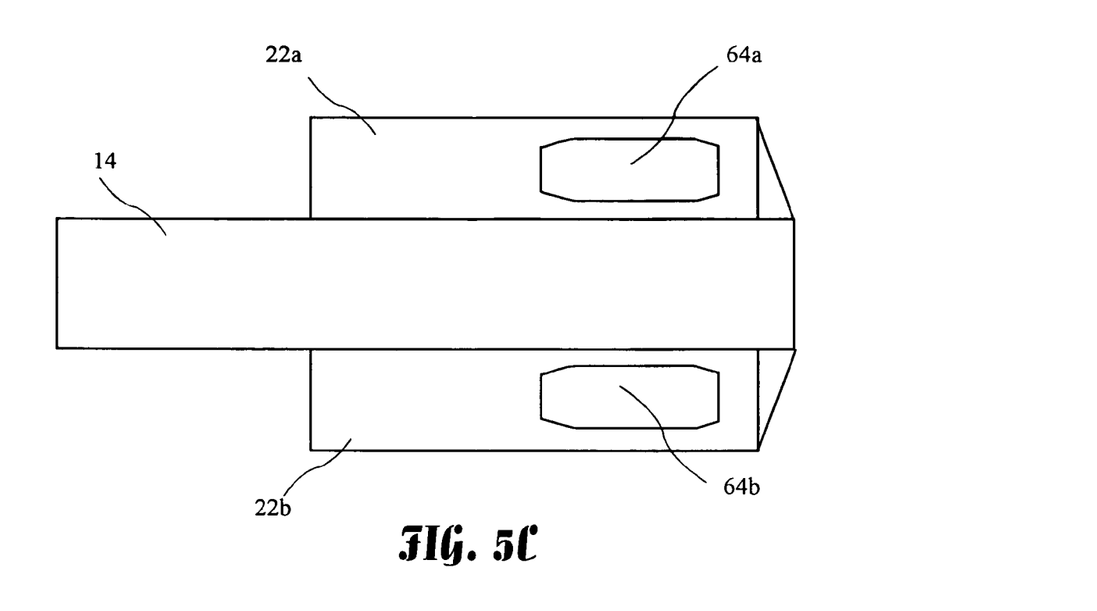
FIG. 5C is an alternative embodiment of the SES including jet motors, according to the present invention.
Figure 6:
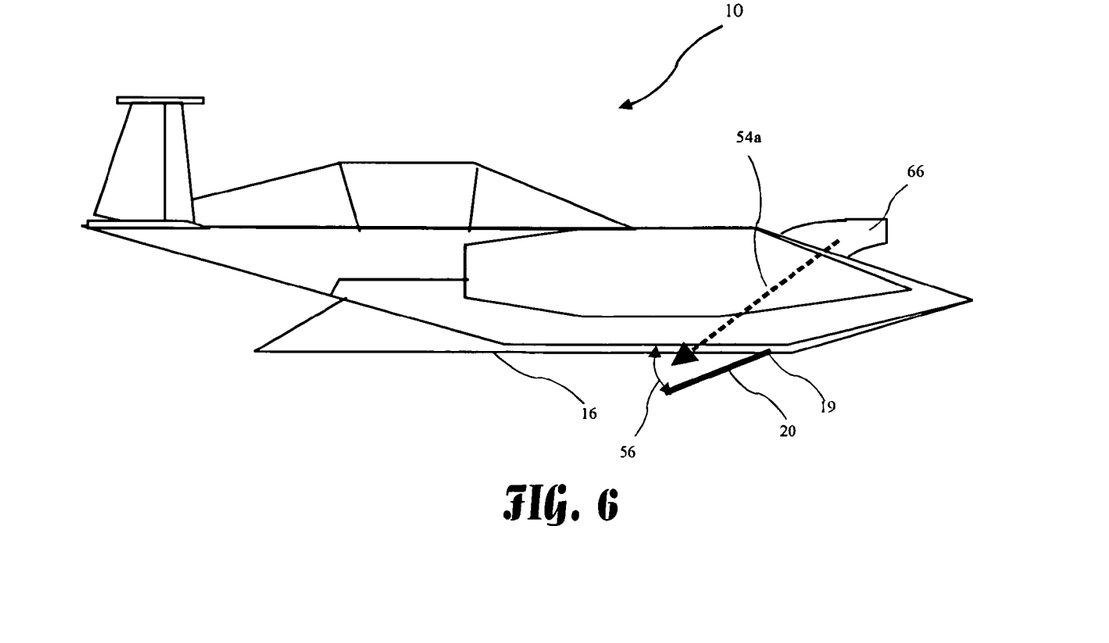
FIG. 6 is an alternative embodiment of the SES including an air scoop, according to the present invention.

An embodiment of a ducted fan is shown in FIG. 5A, having single port fan 42a and single starboard fan 42b. A second embodiment having a port motor 46a and a starboard motor 46b is shown in FIG. 5B. The port motor 46a and starboard motor 46b my be used in cooperation with a single port fan and single starboard fan 42a and 42b, or with forward and rearward port fans 42a, 44a, and forward and rearward starboard fans 42b and 44b as shown in FIG. 3A with a single motor 46. Each of the motors 46a and 46b are preferably connected to the fans 42a and 42b (and to fans 44a, and 44b shown in FIG. 3A, when present), and 44b through clutches 47. Each of the motors 46a and 46b may independently provide power to both port and starboard ducted fans 42a, 42b (and to fans 44a, and 44b shown in FIG. 3A, when present) through belts 48a and 48b, and to the propellor 58. Further, jet motors 64a and 64b may be used to provide thrust as shown in FIG. 5C, which jet motors 64a and 64b may be any axial flow jet engines, turbojet engines, fanjet engines, turboprop engines, or the like. Embodiments such as those including jet motors 64a, 64b may include an air scoop 66 to generate a scoop air flow 54a, as shown in FIG. 6. The downward air flow 54 (see FIG. 4) may directly result from the scoop air flow 54a.

Figure 7:
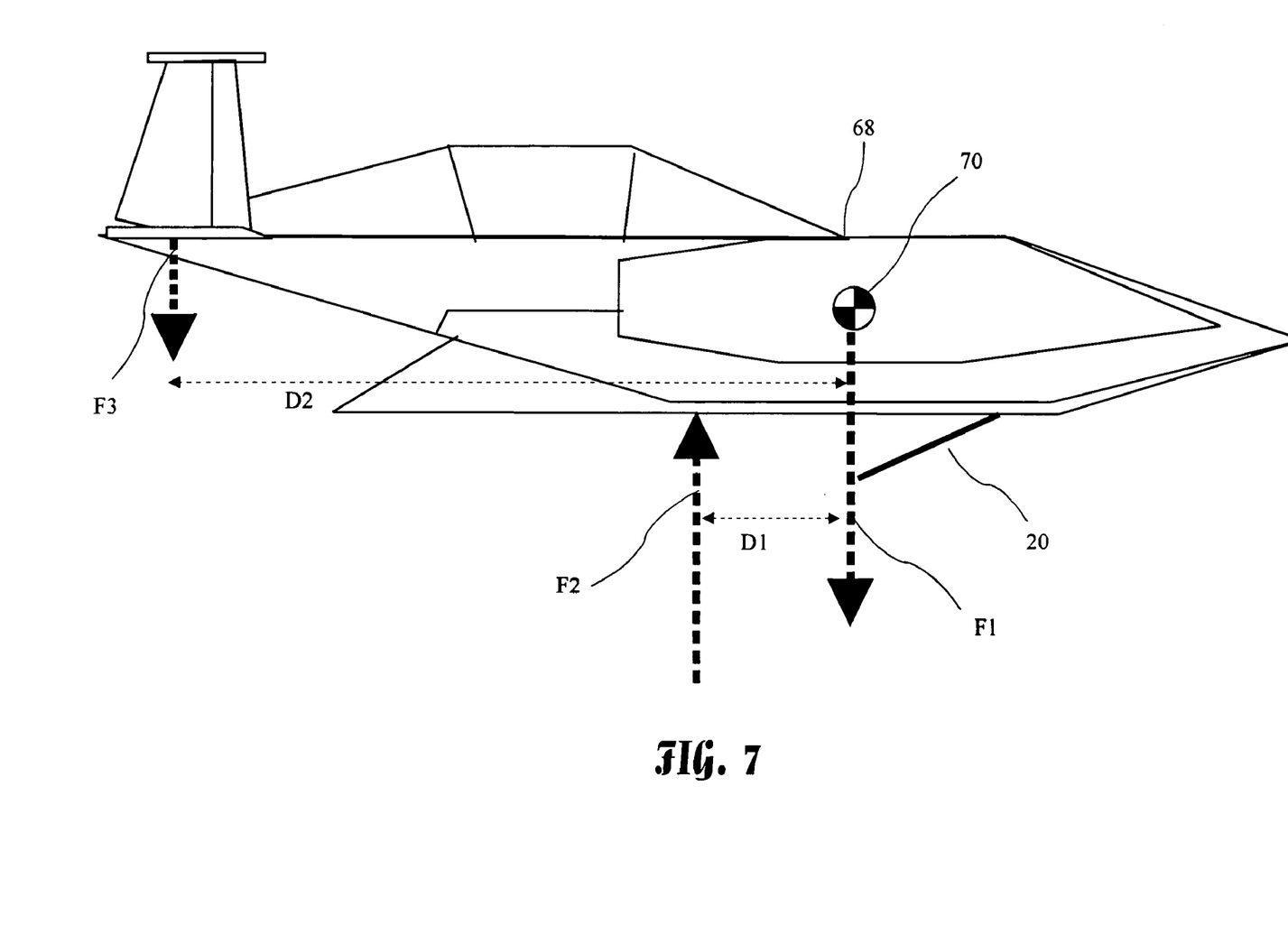
FIG. 7 depicts the balance of forces on the SES.

Aircraft require a balance for force and torque for stable level flight. Similarly, the vehicle 10 requires a balance of force and torque. Further, a forward (relative to control and lift surfaces) center of gravity (CG) 70 is desirable for stability, and the CG 70 is preferably anywhere above the DAG 20, and more preferably approximately below the base of the windshield 68. A diagram of a preferred distribution of the CG 70, vehicle weight vector comprising a first force F1, main lift vector comprising a second force F2, and balancing lift comprising a third force F3 are shown in FIG. 7. The forces F1, F2, and F3 must add to zero for level flight, and the torques F2*D1 and F3*D2 must cancel for level flight. To achieve these results, it is preferable to place the motor 46 near the hull bow 14c, as shown in FIG. 3A.

Figure 8:
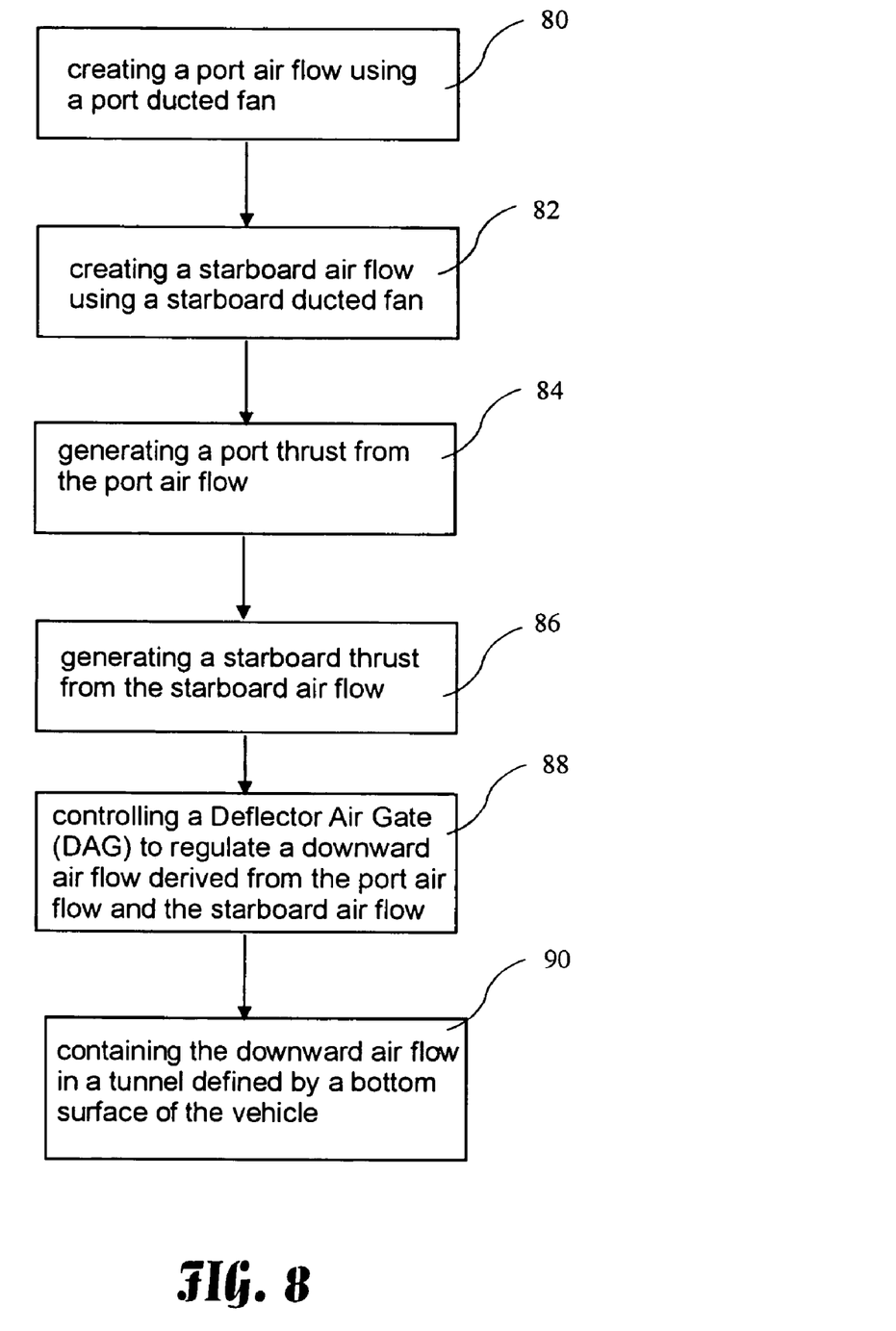
FIG. 8 is a method for an SES according to the present invention.

A method for operating a surface effects vehicle according to the present invention is described in FIG. 8. The method comprises the steps of creating a port air flow using a port ducted fan at step 80, creating a starboard air flow using a starboard ducted fan at step 82, generating a port thrust from the port air flow at step 84, generating a starboard thrust from the starboard air flow at step 86, controlling a Deflector Air Gate (DAG) to regulate a downward air flow derived from the port air flow and the starboard air flow, at step 88, and containing the downward air flow in a tunnel defined by a bottom surface of said vehicle, wherein the downward air flow is controlled by the DAG, a port tunnel edge and a starboard tunnel edge at step 90.

While the present invention has been described in terms of a single occupant vehicle 10, the invention may equally be embodied in significantly larger vehicles capable of carrying large numbers of occupants, or cargo. The vehicle may also retain or delete the canopy 30 (see FIG. 1A). Any surface effect skimmer including at least one ducted fan or jet motor generating an air flow, thrust derived from the air flow, and a downward air flow directed into a tunnel by a DAG 20 to reduce drag, is intended to come within the scope of the present invention.

While the invention herein disclosed has been described by means of specific embodiments and applications thereof, numerous modifications and variations could be made thereto by those skilled in the art without departing from the scope of the invention set forth in the claims.

I claim:
1. A surface effects skimmer comprising:
a main hull suitable for carrying at least one human occupant and having:
a bow of the main hull;
a stern of the main hull;
a port side of the main hull;
a starboard side of the main hull;
a centerline running between the bow and the stern; and
a hull bottom defining a tunnel open to the stern;
at least one rearward thrust for providing propulsion for the surface effects skimmer, and
a downward air flow;
wherein the downward air flow is directed into the tunnel to reduce drag between the hull bottom and an adjacent surface, and wherein the tunnel includes a bow end, and wherein a Deflector Air Gate (DAG) is pivotally attached to the hull bottom near the bow end of said tunnel, wherein the DAG pivots about a DAG axis orthogonal to the hull centerline and substantially on the hull bottom, and wherein the DAG axis is proximal to a bow most portion of the DAG.

2. The surface effects skimmer of claim 1, wherein the hull bottom includes a stern projecting portion defining a tunnel stern portion of said tunnel, and wherein the stern projecting portion defines a sharp stern pointing horizontal edge.

3. The surface effects skimmer of claim 1, wherein the DAG is pivotable between approximately zero degrees relative to the hull bottom to approximately twenty degrees relative to the hull bottom.

4. The surface effects skimmer of claim 1, wherein the DAG regulates the downward air flow into the tunnel.

5. The surface effects skimmer of claim 4, wherein the DAG is approximately the same width as the tunnel and the DAG is approximately square.

6. The surface effects skimmer of claim 1, wherein the at least one rearward thrust comprises a port rearward thrust and a starboard rearward thrust.

7. The surface effects skimmer of claim 1, further including at least one ducted fan creating an air flow, and wherein the at least one rearward thrust is derived from the air flow.

8. The surface effects skimmer of claim 7, wherein the at least one ducted fan comprises at least one port ducted fan creating a port air flow and at least one starboard ducted fan creating a starboard air flow and wherein the at least one rearward thrust comprises a port rearward thrust derived from the port air flow and a starboard rearward thrust derived from the starboard air flow.

9. The surface effects skimmer of claim 8, wherein the at least one port ducted fan comprises a port forward fan and a port rearward fan and the at least one starboard ducted fan comprises a starboard forward fan and a starboard rearward fan.

10. The surface effects skimmer of claim 8, wherein:
the port ducted fan resides in a port ducted fan box and the starboard ducted fan resides in a starboard ducted fan box; and
the port thrust emanates from a rear portion of the port ducted fan box and the starboard thrust emanates from a rear portion of the starboard ducted fan box, and
further including:
a port thrust gate residing proximal to the rear portion of the port ducted fan box and adapted to regulate the port thrust; and a starboard thrust gate residing proximal to the rear portion of the starboard ducted fan box and adapted to regulate the starboard thrust.

11. The surface effects skimmer of claim 7, wherein the at least one ducted fan is powered by an automotive engine.

12. The surface effects skimmer of claim 1, further including an air scoop creating a scoop air flow, and wherein the downward air flow is derived from the scoop air flow.

13. The surface effects skimmer of claim 1, further including a port horizontal stabilizer residing proximal to the stern of the main hull and a starboard horizontal stabilizer residing proximal to the stern of the main hull.

14. The surface effects skimmer of claim 1, further including port and starboard trolling motors for maneuvering at low speed.

15. The surface effects skimmer of claim 1, further including a port outrigger extending outwardly to the port side of the main hull and a starboard outrigger extending outwardly to the starboard side of the main hull, wherein the outriggers are adapted to increase stability.

16. The surface effects skimmer of claim 15, further including a port outrigger tip extending downwardly from the port most edge of the port outrigger and a starboard outrigger tip extending downwardly from the starboard most edge of the starboard outrigger, wherein the outrigger tips are adapted to limit roll when the outrigger tips contact the surface.

17. The surface effects skimmer of claim 1, further including a port outrigger extending outwardly on the port side of the main hull and a starboard outrigger extending outwardly on the starboard side of the main hull, wherein the outriggers are adapted to provide lift.

18. A surface effects skimmer comprising:
a main hull suitable for carrying at least one human occupant and having:
 a bow of the main hull;
 a stern of the main hull;
 a port side of the main hull;
 a starboard side of the main hull;
 a hull centerline running from the bow to the stern; and
 a hull bottom defining a tunnel open to the stern;
at least one port ducted fan for creating a port air flow;
at least one starboard ducted fan for creating a starboard air flow;
a downward air flow derived from the port air flow and the starboard air flow;
a port rearward thrust derived from the port air flow;
a starboard rearward thrust derived from the starboard air flow; and
a Deflector Air Gate (DAG) pivotably attached to the hull bottom near the bow end of said tunnel, wherein the DAG rotates about an axis perpendicular to the hull centerline,
wherein the downward air flow is regulated and directed into the tunnel by said DAG to reduce drag between the hull bottom and an adjacent surface.

19. A surface effects skimmer comprising:
a main hull suitable for carrying at least one human occupant and having:
 a bow of the main hull;
 a stern of the main hull;
 a port side of the main hull
 a starboard side of the main hull;
 a centerline running between the bow and the stern; and
 a hull bottom defining a tunnel open to the stern;
a port outrigger extending outwardly to the port side of the main hull and a starboard outrigger extending outwardly to the starboard side of the main hull, wherein the outriggers are adapted to increase stability;
at least one rearward thrust for providing propulsion for the surface effects skimmer, and
a downward air flow;
wherein the downward air flow is directed into the tunnel to reduce drag between the hull bottom and an adjacent surface.

20. A surface effects skimmer comprising:
a main hull suitable for carrying at least one human occupant and having:
 a bow of the main hull;
 a stern of the main hull;
 a port side of the main hull;
 a starboard side of the main hull;
 a centerline running between the bow and the stern; and
 a hull bottom defining a tunnel open to the stern;
port rearward thrust and a starboard rearward thrust for providing propulsion for the surface effects skimmer, and
a downward air flow;
wherein the downward air flow is directed into the tunnel to reduce drag between the hull bottom and an adjacent surface.

* * * * *

UNITED STATES PATENT AND TRADEMARK OFFICE
CERTIFICATE OF CORRECTION

PATENT NO.        : 7,051,826 B2
APPLICATION NO. : 10/791494
DATED             : May 30, 2006
INVENTOR(S)       : Joseph V. Bertrand It is certified that error appears in the above-identified patent and that said Letters Patent is hereby corrected as shown below:

On the title page item (76), change "Joseph W. Bertrand" to -- Joseph V. Bertrand --

Signed and Sealed this

Fifteenth Day of August, 2006

JON W. DUDAS
*Director of the United States Patent and Trademark Office*